United States Patent
Chen et al.

(10) Patent No.: US 12,540,860 B2
(45) Date of Patent: Feb. 3, 2026

(54) ELECTRONIC SYSTEM AND ELECTRONIC DEVICES THEREOF

(71) Applicant: LITE-ON TECHNOLOGY CORPORATION, Taipei (TW)

(72) Inventors: Chun-Yen Chen, Taipei (TW); Su-Chen Lin, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 295 days.

(21) Appl. No.: 18/414,496

(22) Filed: Jan. 17, 2024

(65) Prior Publication Data

US 2025/0207980 A1 Jun. 26, 2025

(30) Foreign Application Priority Data

Dec. 22, 2023 (TW) ................................. 112150299

(51) Int. Cl.
*G01K 1/02* (2021.01)
*G06F 13/20* (2006.01)

(52) U.S. Cl.
CPC ............. *G01K 1/026* (2013.01); *G06F 13/20* (2013.01)

(58) Field of Classification Search
None
See application file for complete search history.

(56) References Cited

U.S. PATENT DOCUMENTS

| | | | | |
|---|---|---|---|---|
| 10,802,512 | B2* | 10/2020 | Moore | G05B 15/02 |
| 12,425,294 | B2* | 9/2025 | Gottschalk | H04L 12/2803 |
| 2013/0124736 | A1* | 5/2013 | Park | H04L 67/12 |
| | | | | 709/227 |
| 2023/0213909 | A1* | 7/2023 | Galvez | G05B 19/042 |
| | | | | 700/28 |

FOREIGN PATENT DOCUMENTS

| | | |
|---|---|---|
| CN | 108038034 A | 5/2018 |
| CN | 208569522 U | 3/2019 |
| TW | I782634 B | 11/2022 |

OTHER PUBLICATIONS

Office Action issued by Taiwan Intellectual Property Office on Aug. 29, 2024.

* cited by examiner

*Primary Examiner* — Quang N Nguyen
(74) *Attorney, Agent, or Firm* — WPAT, PC (57) ABSTRACT

A first electronic device of an electronic system of includes a temperature sensor, a first universal asynchronous receiver/transmitter (UART) and a first processor. The temperature sensor is configured to sense a measured temperature value. The first processor is electrically connected to the first UART and the temperature sensor and is configured to set a first baud rate of the first UART as a baud rate setting value corresponding to the next-1-level temperature point based on the measured temperature value changing from a current temperature point to the next-1-level temperature point, and generate an adjustment signal. The second electronic device of the electronic system includes a second UART and a second processor. The second processor is electrically connected to the second UART and is configured to set a second baud rate of the second UART as the baud rate setting value according to the adjustment signal.

19 Claims, 8 Drawing Sheets

ELECTRONIC SYSTEM AND ELECTRONIC DEVICES THEREOF

This application claims the benefit of Taiwan application Serial No. 112150299, filed Dec. 22, 2023, the disclosure of which is incorporated by reference herein in its entirety.

TECHNICAL FIELD

The disclosure relates in general to an electronic system and an electronic device thereof.

BACKGROUND

Two single-chip systems (SoCs) must first set the same baud rate, before transmitting data with the universal asynchronous receiver/transmitter (UART), for achieving high accuracy data transmission. However, the SoC is easily affected by temperature, causing the baud rate settings of the two SoCs to deviate or be inconsistent with each other (the frequencies of the single-chip systems are inconsistent), and it results in the increase of the data transmission error rate.

SUMMARY

The present disclosure provides an electronic system and an electronic device thereof capable of resolving the conventional problem.

According to an embodiment, an electronic system is provided. The electronic system includes a first electronic device and a second electronic device. The first electronic device includes a temperature sensor, a first UART and a first processor. The temperature sensor is configured to sense a measured temperature value. The first processor is electrically connected to the first UART and the temperature sensor, and configured to set a value of a first baud rate of the first UART as a baud rate setting value according to a next-1-level temperature point based on the measured temperature value changing from a current temperature point to the next-1-level temperature point; and generate a baud rate adjustment signal. The second electronic device includes a second UART and a second processor. The second processor is electrically connected to the second UART and configured to set a value of a second baud rate of the second UART as the baud rate setting value according to the baud rate adjustment signal.

According to another embodiment, an electronic system is provided. The electronic system includes a first electronic device and a second electronic device. The first electronic device includes a first temperature sensor, a first UART and a first processor. The first temperature sensor is configured to sense a first measured temperature value. The first processor electrically is connected to the first UART and the first temperature sensor and configured to set a value of a first baud rate of the first UART as a baud rate setting value according to a next-1-level temperature point based on the first measured temperature value changing from a current temperature point to the next-1-level temperature point. The second electronic device incudes a second temperature sensor, a second UART and a second processor. The second temperature sensor is configured to sense a second measured temperature value. The second processor is electrically connected to the second UART and the second temperature sensor and configured to set a value of a second baud rate of the second UART as the baud rate setting value according to the next-1-level temperature point based on the second measured temperature value changing from the current temperature point to the next-1-level temperature point.

According to another embodiment, an electronic device is provided. The electronic device includes a temperature sensor, a first UART and a first processor. The temperature sensor is configured to sense a measured temperature value. The first processor is electrically connected to the first UART and the temperature sensor and configured to set a value of a first baud rate of the first UART as a baud rate setting value according to a next-1-level temperature point based on the measured temperature value changing from a current temperature point to the next-1-level temperature point; and generate a baud rate adjustment signal. Wherein the baud rate adjustment signal is configured to allow a second processor of a second electronic device to set a value of a second baud rate of a second UART of the second electronic device as the baud rate setting value.

According to another embodiment, an electronic device is provided. The electronic device includes a temperature sensor, a processor and a UART. The processor is electrically connected to the temperature sensor and configured receive a measured temperature value from the temperature sensor. The UART is electrically connected to the processor. The processor is further configured to compare the measured temperature value with a temperature reference value; and set a baud rate according to a difference between the measured temperature value and the temperature reference value. The greater the difference is, the smaller the baud rate is.

The above and other aspects of the disclosure will become better understood with regard to the following detailed description of the preferred but non-limiting embodiment(s). The following description is made with reference to the accompanying drawings.

DETAILED DESCRIPTION

Figure 1A:
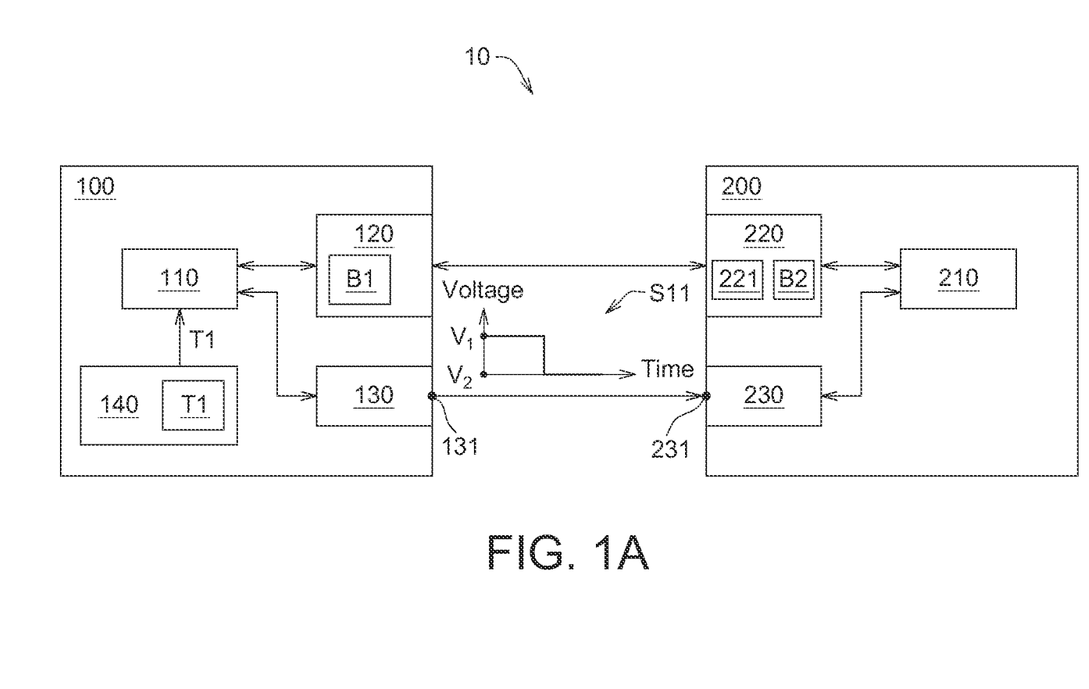
FIG. 1A illustrates a schematic diagram of a baud rate adjustment signal of the electronic system changing from a first level to a second level according to an embodiment of the present invention.
Figure 1B:
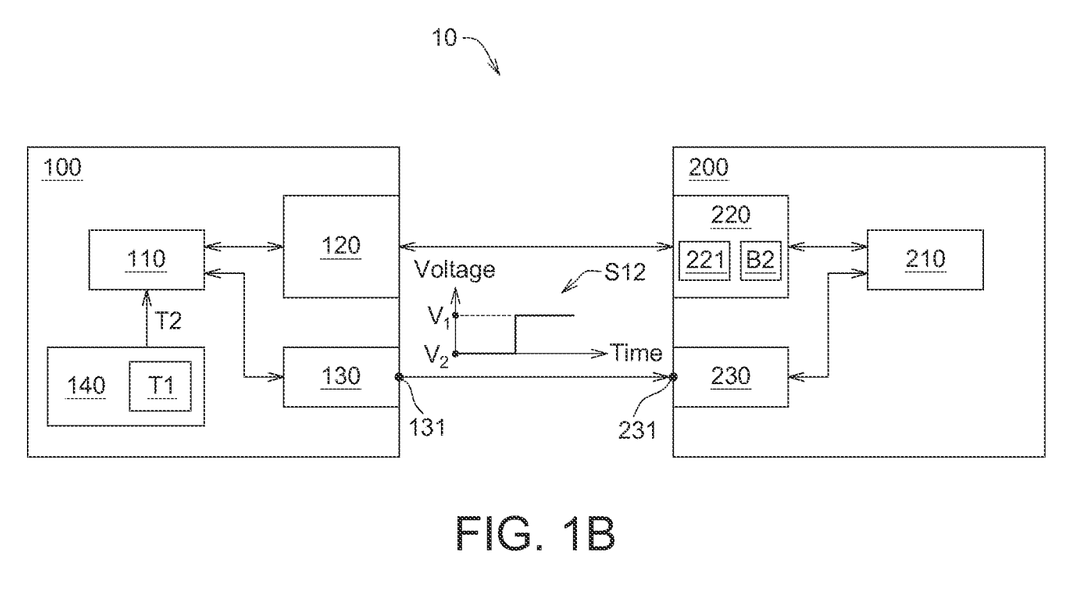
FIG. 1B illustrates a schematic diagram of a baud rate adjustment signal of the electronic system 10 in FIG. 1A changing from the second level to the first level.
Figure 2:
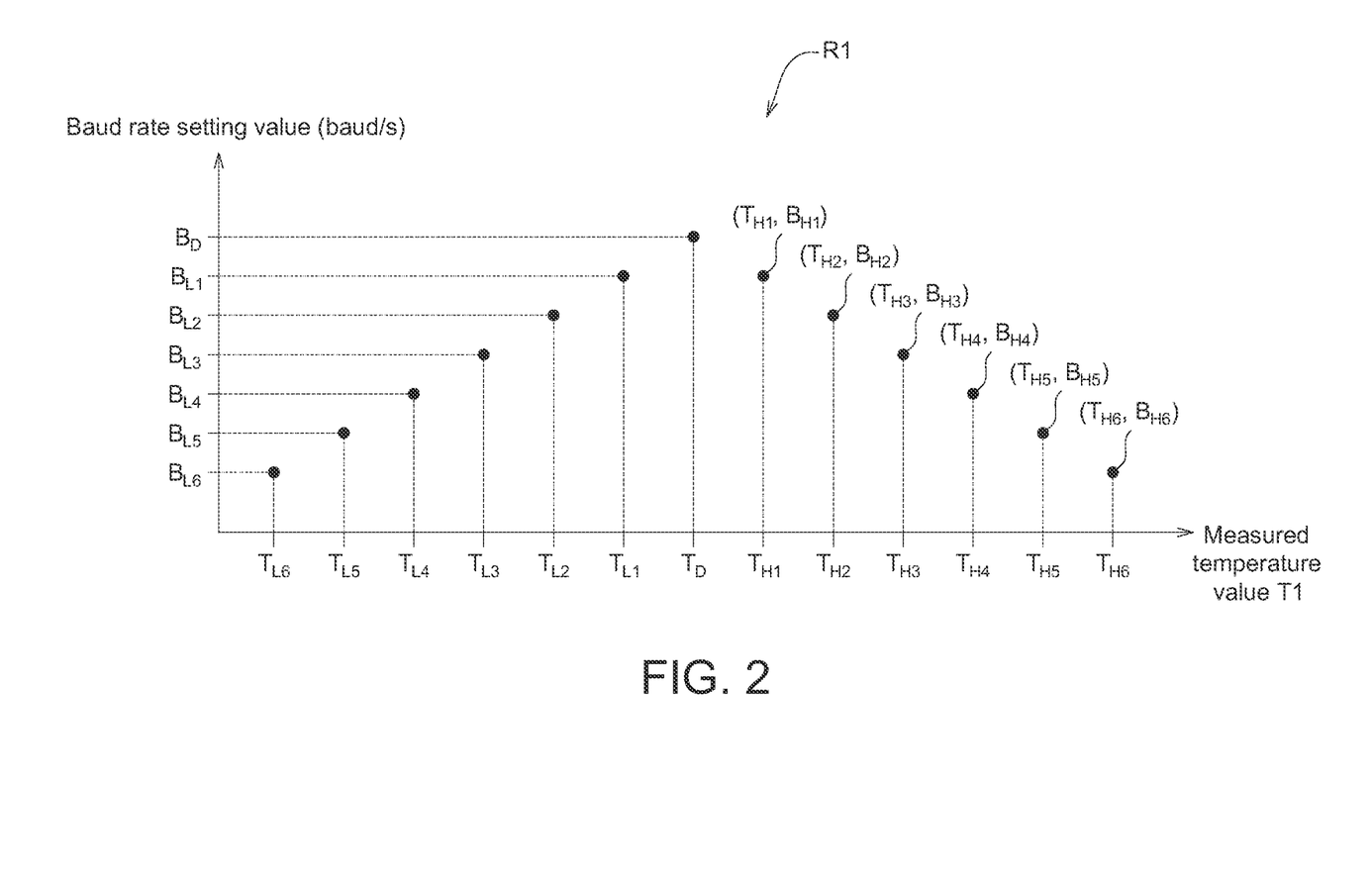
FIG. 2 illustrates a schematic diagram of a corresponding relationship between a measured temperature value and the baud rate according to an embodiment of the present invention.

Referring to FIGS. 1A to 2, FIG. 1A illustrates a schematic diagram of a baud rate adjustment signal S11 of the electronic system 10 changing from a first level V1 to a second level V2 according to an embodiment of the present invention, FIG. 1B illustrates a schematic diagram of a baud rate adjustment signal S12 of the electronic system 10 in FIG. 1A changing from the second level V2 to the first level V1, and FIG. 2 illustrates a schematic diagram of a corresponding relationship R1 between a measured temperature value T1 and the baud rate according to an embodiment of the present invention.

The electronic system 10 is, for example, various electronic devices such as a sweeping robot, a mobile phone, a camera, etc. The electronic system 10 includes a first electronic device 100 and a second electronic device 200. One of the first electronic device 100 and the second electronic device 200 may be disposed on a host of the electronic system 10, and the other one of the first electronic device 100 and the second electronic device 200 may be disposed on a battery or a peripheral component of the electronic system 10. In an embodiment, the electronic system 10 further includes a casing (not illustrated), wherein the first electronic device 100 and the second electronic device 200 may both be disposed in the same casing. In another embodiment, the electronic system 10 includes two separate casings (not illustrated), wherein the first electronic device 100 may be disposed in one of the two separate casings, and the second electronic device 200 may be disposed in the other one of the two separate casings.

As illustrated in FIGS. 1A and 1B, the first electronic device 100 includes a first processor 110, a first UART 120, a first general-purpose input/output (GPIO) 130 and the first temperature sensor 140. The second electronic device 200 includes a second processor 210, a second UART 220, and a second GPIO 230. The first temperature sensor 140 is configured to sense the first measured temperature value T1. The first processor 110 is electrically connected to the first UART 120 and the first temperature sensor 140. The first processor 110 is configured to set the value of the first baud rate B1 of the first UART 120 as the baud rate setting value corresponding to the next-1-level temperature point based on the first measured temperature value T1 changing of from the current temperature point to the next-1-level temperature point; and generate the baud rate adjustment signal (S11 or S12). The second processor 210 is electrically connected to the second UART 220 and is configured to set the value of the second baud rate B2 of the second UART 220 as the baud rate setting value according to the baud rate. As a result, the first UART 120 and the second UART 220 may transmit data at substantially the same baud rate setting, thereby reducing the data transmission error rate.

The first processor 110, the first UART 120, the first GPIO 130 and the first temperature sensor 140 are, for example, physical circuits formed by using at least one semiconductor process. In an embodiment, the first processor 110, the first UART 120 and the first GPIO 130 may be integrated into a single component, such as a SoC (system on a chip). The first temperature sensor 140 is configured to continuously sense the first measured temperature value T1. The first temperature sensor 140 may be disposed adjacent to the SoC, so that the first measured temperature value T1 sensed by the first temperature sensor 140 is close to an actual temperature of the SoC. Similarly, the second processor 210, the second UART 220 and the second GPIO 230 are, for example, physical circuits formed using at least one semiconductor process. In an embodiment, the second processor 210, the second UART 220 and the second GPIO 230 may be integrated into a single component, such as another Soc.

As illustrated in FIG. 2, the corresponding relationship R1 is a relationship between the first measured temperature value T1 and the baud rate setting value. The corresponding relationship R1 may be pre-stored in the first electronic device 100, such as the first processor 110, the first UART 120 or another storage (not illustrated, which is, for example, a memory). In addition, the corresponding relationship R1 may be pre-stored in the second electronic device 200, such as the second processor 210, the second UART 220, or another storage (not illustrated, which is, for example, a memory). The temperature point $T_D$ corresponding to R1 is, for example, a preset (or default) value. For example, when the first electronic device 100 is initially started (e.g., switched to a booting state (turned on) from a shutdown state (turned off)), the first processor 110 determines the baud rate setting value $B_D$ by the preset temperature point $T_D$.

As illustrated in FIG. 2, in the corresponding relationship R1, one temperature point is corresponding to one baud rate setting value. In an embodiment, $(T_D, B_{D1})=(25, 230400)$, $B_{L1}=B_{H1}=57600$, $B_{L2}=B_{H2}=28800$, $B_{L3}=B_{H3}=14400$, $B_{L4}=B_{H4}=2400$, $B_{L5}=B_{H5}=1200$ and $B_{L6}=B_{H6}=600$. In another implementation, the baud rate setting values $B_{L1}$ and $B_{H1}$ may be different, the baud rate setting values $B_{L2}$ and $B_{H2}$ may be different, the baud rate setting values $B_{L3}$ and $B_{H3}$ may be different, the baud rate setting values $B_{L4}$ and $B_{H4}$ may be different, the baud rate setting values $B_{L5}$ and $B_{H5}$ may be different, and the baud rate setting values $B_{L6}$ and $B_{H6}$ may be different. The interval between two adjacent temperature points may be 1, 2, 5, 10, 15, or other greater real number or smaller real number. In addition, the unit of the temperature point is, for example, degrees Celsius (° C.), and the unit of the baud rate is, for example, baud/s.

As illustrated in FIG. 2, in case of the temperature point $T_D$ as a temperature reference value, the greater the difference between the first measured temperature value T1 and the temperature reference value is (the first measured temperature value T1 gets closer to the endpoint of the corresponding relationship R1), the smaller the baud rate setting value which is set is. Furthermore, the first processor 110 is configured to compare the first measured temperature value T1 with the temperature reference value; and set the first baud rate B1 according to the difference between the first measured temperature value T1 and the temperature reference value, wherein the greater the difference is, the smaller the value of the first baud rate B1 which is set is.

The occurrence time of the "current temperature point" in the present disclosure is earlier than the occurrence time of the "next-1-level temperature point". The "current temperature point" and the "next-1-level temperature point" are not related to high or low temperatures. Depending on the temperature rise or temperature drop, the "next-1-level temperature point" may be higher or lower than the "current temperature point". Depending on the actual situation, the "current temperature point" in the present disclosure may be equal to or close to one of the temperature points in FIG. 2, and the "next-1-level temperature point" may be equal to or close to another of these temperature points in FIG. 2. In addition, a difference between the "current temperature point" and the "next-1-level temperature point" is one level. The difference between the "current temperature point" and "the next-2-level temperature point" is two levels, and so on. The difference between the "current temperature point" and the "the next-N-level temperature point" is N levels, wherein N is a positive integer equal to or greater than 1. The embodiment of the present invention does not limit the maximum value of N. For the temperature drop, when the "current temperature point" is the temperature point $T_{H3}$, the "next-2-level temperature point" is the temperature point $T_{H1}$.

As illustrated in FIGS. 1A and 2, for the temperature drop, in case of the current temperature point being $T_D$ and the next-1-level temperature point being $T_{L1}$, the first processor 110 sets the value of the first baud rate B1 of the first UART 120 as the baud rate setting value $B_{L1}$ corresponding to the next-1-level temperature point $T_{L1}$ based on the first measured temperature value T1 changing from the current temperature point $T_D$ to the next-one-level temperature point $T_{L1}$. Based on the first measured temperature value T1 changing from the current temperature point $T_D$ to the next-1-level temperature point $T_{L1}$, the second processor 210 sets the value of the second baud rate B2 of the second UART 220 as the baud rate setting value $B_{L1}$.

As illustrated in FIGS. 1B and 2, for the temperature rise, in case of the current temperature point being $T_D$ and the next-1-level temperature point being $T_{H1}$, the first processor 110 sets the value of the first baud rate B1 of the first UART 120 as the baud rate setting value $B_{H1}$ corresponding to the next-1-level temperature point $T_{H1}$ based on the first measured temperature value T1 changing from the current temperature point $T_D$ to the next-1-level temperature point $T_{H1}$. Based on the first measured temperature value T1 changing from the current temperature point $T_D$ to the next-1-level temperature point $T_{H1}$, the second processor 210 sets the value of the second baud rate B2 of the second UART 220 to the baud rate setting value $B_{H1}$.

As illustrated in FIGS. 2A to 2B, the first processor 110 is further configured to transmit the baud rate adjustment signal (S11 or S12) to the second electronic device 200 through the first GPIO 130 based on the first measured temperature value T1 changing from the current temperature point to the next-1-level temperature point. The second processor 210 sets the value of the second baud rate B2 as the baud rate setting value according to the baud rate adjustment signal. Furthermore, the transmission of the GPIO is not affected by the baud rate and the temperature, and thus the baud rate adjustment signal may be stably transmitted between the first GPIO 130 and the second GPIO 230 regardless of temperature changes.

For example, as illustrated in FIG. 1A, in the case of temperature drop, the baud rate adjustment signal S11 includes a signal changing from the first level V1 to the second level V2. The first GPIO 130 transmits the baud rate adjustment signal S11 to the second electronic device 200 based on the change of the first measured temperature value T1 from the current temperature point to the next-1-level temperature point. The second processor 210 sets the value of the second baud rate B2 as the baud rate setting value according to the baud rate adjustment signal S11. As illustrated in FIG. 1B, for the temperature rise, the baud rate adjustment signal S12 includes, for example, a signal changing from the second level V2 to the first level V1. The second processor 210 sets the value of the second baud rate B2 as the baud rate setting value according to the baud rate adjustment signal S12. In addition, the first level V1 is different from the second level V2. For example, the voltage value of the first level V1 is higher than the voltage value of the second level V2. The embodiment of the present invention does not limit the actual voltage values of the first level V1 and the second level V2. In another embodiment, the baud rate adjustment signal S11, for example, includes a signal that changes from the second level V2 to the first level V1, and the baud rate adjustment signal S12 includes, for example, a signal that changes from the first level V1 to the second level. Signal at level V2.

In an embodiment, as illustrated in FIGS. 1A and 2, when the first electronic device 100 is initially started (for example, switched from the shutdown state to the booting state), the first temperature sensor 140 has not yet sensed the first measured temperature T1 or the first measured temperature value T1 is not yet accurate, so the first processor 110 sets the value of the first baud rate B1 as the preset baud rate setting value $B_D$ (corresponding to the preset temperature value $T_D$). Similarly, when the second electronic device 200 is initially started (for example, switched from the shutdown state to the booting state), the second processor 210 sets the value of the second baud rate B2 as the preset baud rate setting value $B_D$.

In an embodiment, the first processor 110 sequentially transmits the baud rate adjustment signal to the second electronic device 200 for N times based on the change of the first measured temperature value T1 from the current temperature point to the next-N-level temperature point. The second processor 210 of the second electronic device 200 sequentially sets the value of the second baud rate B2, according to the corresponding relationship R1, based on the receiving of N times of baud rate adjustment signal. In other words, the second electronic device 200 in the present embodiment determines the baud rate setting value based on the number of times of the received baud rate adjustment signal. In addition, the second electronic device 200 obtains the "next-1-level temperature point" and the corresponding baud rate setting value, from the corresponding relationship R1, according to the number of the received baud rate adjustment signal.

As illustrated in FIGS. 1A and 2, in case of N being equal to 2 and the temperature drop, when the first measured temperature value T1 sensed by the first temperature sensor 140 after a period of initial activation is the temperature point $T_{L2}$, the first processor 110 transmits the baud rate adjustment signal S11 to the second electronic device 200 twice based on the change of the first measured temperature value T1 from the current temperature point $T_D$ to the next two-level temperature point $T_{L2}$. Based on receiving the baud rate adjustment signal S11 twice, the second processor 210 of the second electronic device 200 sequentially adjusts the value of the second baud rate B2 to be the baud rate setting value $B_{L2}$ from the preset baud rate setting value $B_D$ according to the corresponding relationship R1. Furthermore, when the second processor 210 receives the baud rate adjustment signal S11 for the $1^{st}$ time, the value of the second baud rate B2 is adjusted from the preset baud rate setting value $B_D$ to the baud rate setting. value $B_{L1}$; when the second processor 210 receives the baud rate adjustment signal S11 for the $2^{nd}$ time, the value of the second baud rate B2 is adjusted from the baud rate setting value $B_{L1}$ to the baud rate setting value $B_{L2}$.

As illustrated in FIGS. 1B and 2, in case of N being equal to 2 and the temperature rise, when the first measured temperature value T1 sensed by the first temperature sensor 140 after a period of initial activation is the temperature point $T_{H2}$, the first processor 110 transmits the baud rate adjustment signal S12 to the second electronic device 200 twice based on the change of the first measured temperature value T1 from the current temperature point $T_D$ to the next two-level temperature point $T_{H2}$. Based on receiving the baud rate adjustment signal S12 twice, the second processor 210 of the second electronic device 200 sequentially adjusts the value of the second baud rate B2 to be the baud rate setting value $B_{H2}$ from the preset baud rate setting value $B_D$ according to the corresponding relationship R1. Furthermore, when the second processor 210 receives the baud rate adjustment signal S12 for the $1^{st}$ time, the value of the second baud rate B2 is adjusted from the preset baud rate setting value $B_D$ to the baud rate setting. value $B_{H1}$; when the second processor 210 receives the baud rate adjustment signal S12 for the $2^{nd}$ time, the value of the second baud rate B2 is adjusted from the baud rate setting value $B_{H1}$ to the baud rate setting value $B_{H2}$.

In addition, when the "next-1-level temperature point" is the endpoint value of the corresponding relationship R1 (for example, the extreme value of these temperature points in the corresponding relationship R1, such as the temperature point $T_{L6}$ or $T_{H6}$ in FIG. 2), the transmission error rate between the first electronic device 100 and the second electronic device 200 is still too high or fails, the second electronic device 200 may adjust the initial value of the oscillator 221 of the second UART 220. The oscillator 221 is, for example, a resistor-capacitor (RC) oscillator.

Taking the endpoint value as the temperature point $T_{L6}$ for example, when the first measured temperature value T1 changes from the current temperature point to the temperature point $T_{L6}$, the first processor 110 sets the value of the first baud rate B1 of the first UART 120 as the baud rate setting value $B_{L6}$ corresponding to the temperature point $T_{L6}$. If the first baud rate B1 of the first electronic device 100 and the second baud rate B2 of the second electronic device 200 are both set as the baud rate setting value $B_{L6}$, the communication still fails (indicating that it It's possible that the initial value of the oscillator 221 of the second UART 220 is set too low), and the first electronic device 100 accordingly transmits an oscillator adjustment signal to the second electronic device 200. The second processor 210 of the second electronic device 200 adjusts the initial value of the oscillator 221 of the second UART 220 according to the oscillator adjustment signal. The oscillator adjustment signal includes the signal the same as or similar to that of the baud rate adjustment signal.

Furthermore, the initial value of the oscillator 221 of the second UART 220 is, for example, 0x15 (hexadecimal value), wherein such initial value indicates that the oscillator 221 may generate an oscillation frequency of 32.768 MHz at the preset temperature point $T_D$. The oscillation frequency of the oscillator 221 increases with the temperature drop. For example, when the first measured temperature value T1 decreases to the temperature point $T_{L6}$, the oscillation frequencies of the oscillators 221 of most of the second UARTs 220 may decrease to 37 Kohms from 32.768 KHz. However, due to some factors, when the first measured temperature value drops to the temperature point $T_{L6}$, the oscillation frequency of the oscillator 221 of a few second UARTs 220 cannot be reduced to 37 KHz (for example, it can only be reduced to 36 KHz). In response to this, the initial value of the oscillator 221 may be increased (for example, adjusted to be higher than 0x15), so that when the first measured temperature value decreases to the temperature point $T_{L6}$, the oscillation frequency of the oscillator 221 of these few second UARTs 220 may be reduced to 37 KHz from 32.768 KHz.

As illustrated in FIG. 1A, the first GPIO 130 may include a plurality of pins (only the pin 131 is illustrated in FIG. 1A), and the second GPIO 230 may include a plurality of pins (only the pin 231 is illustrated in FIG. 1A). The first GPIO 130 of the electronic system 10 is electrically connected to one pin 231 of the second GPIO 230 through one pin 131, wherein the baud rate adjustment signal may be transmitted in a connection between the pin 131 of the first GPIO 130 and the pin 231 of the second GPIO 230.

Figure 3A:
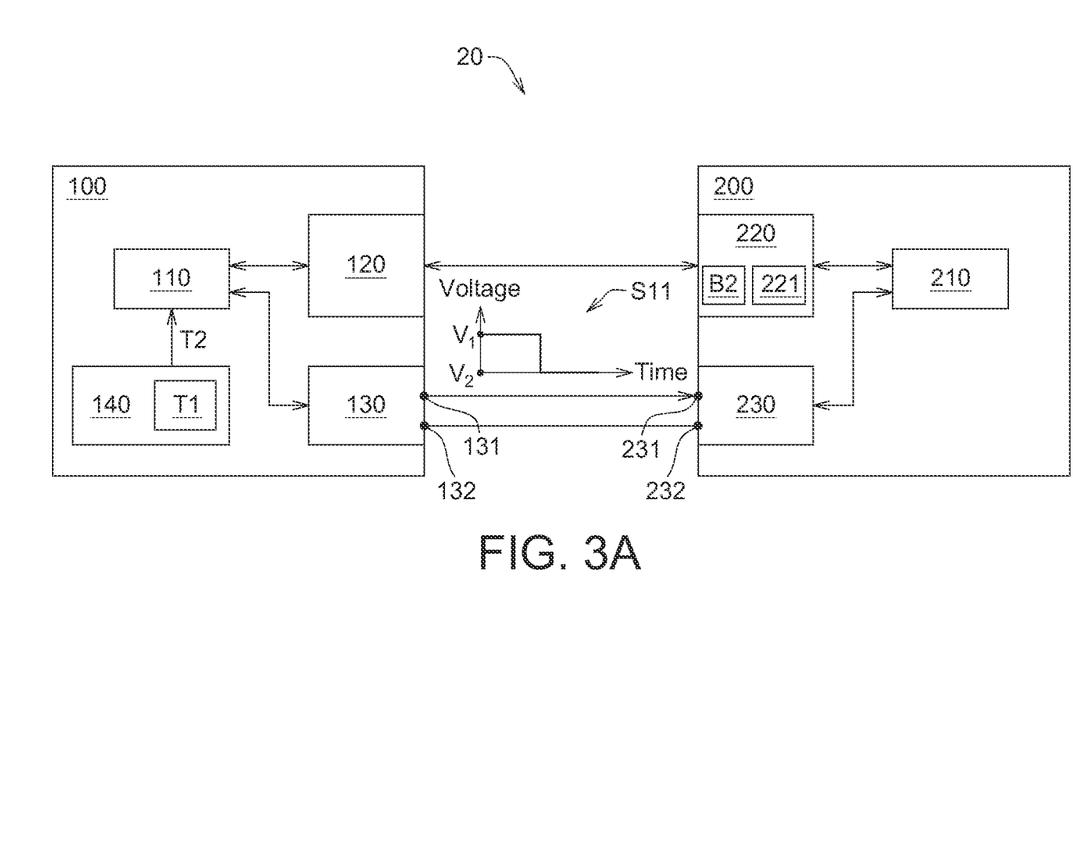
FIG. 3A illustrates a schematic diagram of the first electronic device of the electronic system transmitting the baud rate adjustment signal to the second electronic device according to another embodiment of the present invention.
Figure 3B:
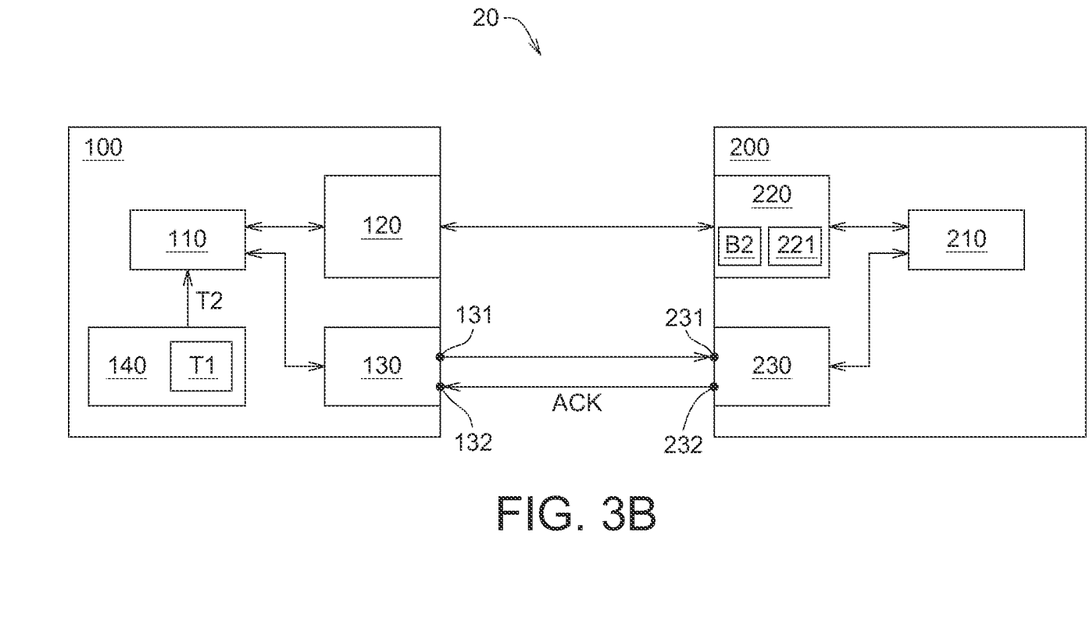
FIG. 3B illustrates a schematic diagram of the second electronic device of the electronic system transmitting an acknowledgement signal to the first electronic device.

Referring to FIGS. 3A to 3B, FIG. 3A illustrates a schematic diagram of the first electronic device 100 of the electronic system 20 transmitting the baud rate adjustment signal S11 to the second electronic device 200 according to another embodiment of the present invention, and FIG. 3B illustrates a schematic diagram of the second electronic device 200 of the electronic system 20 transmitting an acknowledgement signal ACK to the first electronic device 100.

As illustrated in FIG. 3A, the electronic system 20 is, for example, various electronic devices such as a sweeping robot, a mobile phone, a camera, etc. The electronic system 20 includes the first electronic device 100 and a second electronic device 200. The first electronic device 100 includes the first processor 110, the first UART 120, the first GPIO 130 and the first temperature sensor 140. The second electronic device 200 includes a second processor 210, a second UART 220 and a second GPIO 230. The electronic system 20 includes the technical features the same as or similar to that of the electronic system 10, and at least one difference is that the first UART 120 of the electronic system 20 are electrically connected with two pins 231 and 232 of the second UART 220 by two pins 131 and 132.

As illustrated in FIG. 3A, the baud rate adjustment signal (S11 or S12) may be transmitted in the connection between the pin 131 of the first GPIO 130 and the pin 231 of the second GPIO 230. As illustrated in FIG. 3B, when the second GPIO 230 of the second electronic device 200 receives the baud rate adjustment signal, the second processor 210 transmits the acknowledgement signal ACK to the pin 132 of the first UART 130 of the first electronic device 100 through the pin 232 of the second GPIO 230. When the first electronic device 100 receives the acknowledgement signal ACK from the second electronic device 200, it is determined that the second electronic device 200 has received the baud rate adjustment signal. In an embodiment, the acknowledgement signal ACK may have the features the same as that of the baud rate adjustment signal (S11 or S12). In other words, when the second electronic device 200 receives the adjustment signal S11, the transmitted acknowledgement signal ACK is the same as or similar to the received baud rate adjustment signal S11; when the second electronic device 200 receives the baud rate adjustment signal S12, the transmitted acknowledgement signal ACK is the same as or similar to the received baud rate adjustment signal S12.

In addition, the electronic system 20 may also use the aforementioned initial value setting method of the oscillator 221 of the electronic system 10.

Figure 4:
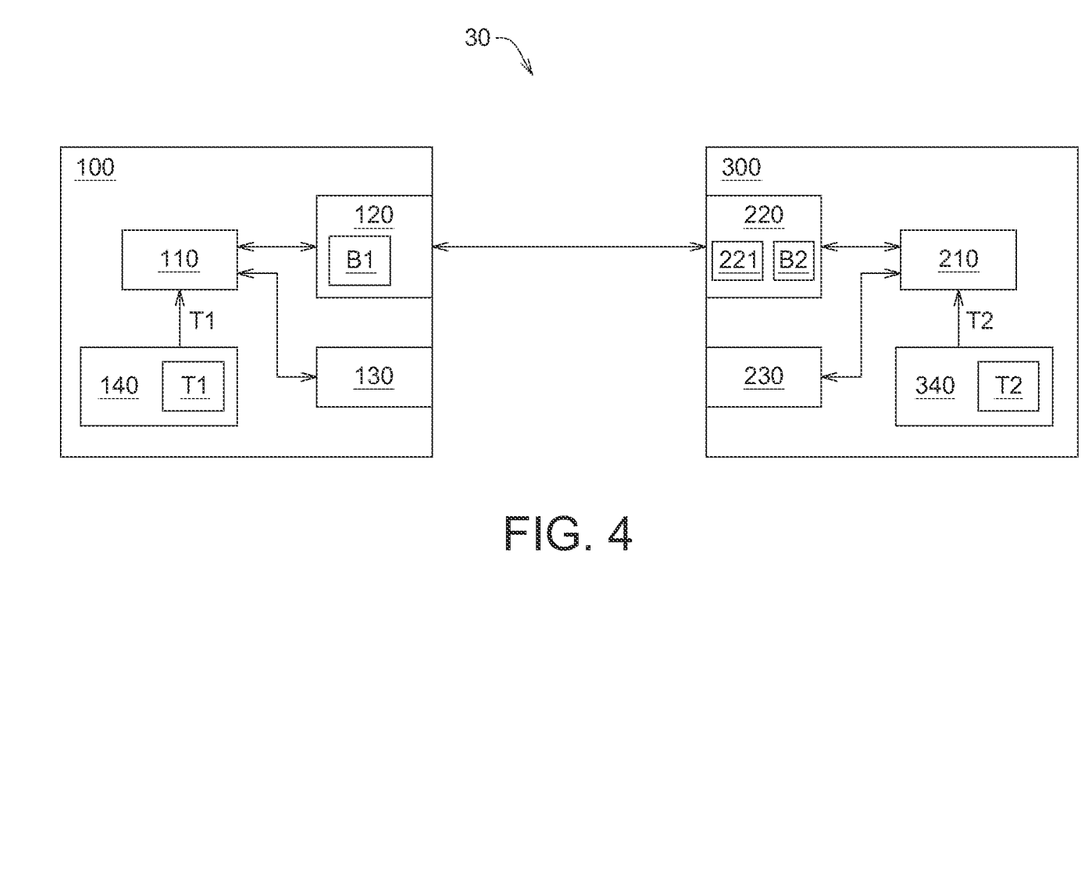
FIG. 4 illustrates a schematic diagram of an electronic system according to another embodiment of the present invention.

Referring to FIG. 4, FIG. 4 illustrates a schematic diagram of an electronic system 30 according to another embodiment of the present invention. The electronic system 30 is, for example, various electronic devices such as a sweeping robot, a mobile phone, a camera, etc. The electronic system 30 includes the first electronic device 100 and a second electronic device 300. The first electronic device 100 includes the first processor 110, the first UART 120, the first GPIO 130 and the first temperature sensor 140. The second electronic device 300 includes the second processor 210, the second UART 220, the second GPIO 230 and a second temperature sensor 340.

The electronic system 30 includes the technical features the same as or similar to that of the electronic system 10, and at least one difference is that the second electronic device 300 of the electronic system 30 further includes the second temperature sensor 340.

The second processor 210, the second UART 220, the second GPIO 230 and/or the second temperature sensor 340 are, for example, physical circuits formed by using at least one semiconductor process. In an embodiment, the second processor 210, the second UART 220 and the second GPIO 230 may be integrated into a single component, such as a SoC. The second temperature sensor 340 is configured to continuously sense the second measured temperature value T2. The second temperature sensor 340 may be disposed adjacent to the SoC, so that the second measured temperature value T2 sensed by the second temperature sensor 340 is close to the actual temperature of the SoC.

As illustrated in FIG. 4, the first temperature sensor 140 is configured to sense the first measured temperature value T1. The first processor 110 is electrically connected to the first UART 120 and the first temperature sensor 140. The first processor 110 is configured to set the value of the first baud rate B1 of the first UART 120 as the baud rate setting value corresponding to the next-1-level temperature point based on the change of the first measured temperature value T1 from the current temperature point to the next-1-level temperature point. The second temperature sensor 340 is configured to sense the second measured temperature value T2. The second processor 210 is electrically connected to the second UART 220 and the second temperature sensor 340 and is configured to set the value of the second baud rate B2 of the second UART 220 as the baud rate setting value corresponding to the next-1-level temperature point based on the change of the second measured temperature value T2 from the current temperature point to the next-1-level temperature point. the first UART 120 and the second UART 220 may transmit data at substantially the same baud rate setting, thereby reducing the data transmission error rate.

As illustrated in FIGS. 2 and 4, taking the temperature point $T_D$ as the temperature reference value for example, the greater the difference between the first measured temperature value T1 and the temperature reference value is (the first measured temperature value T1 gets closer to the endpoint of the corresponding relationship R1), the smaller the baud rate setting value which is set is. Furthermore, the first processor 110 is configured to compare the first measured temperature value T1 with the temperature reference value; and set the first baud rate B1 according to the difference between the first measured temperature value T1 and the temperature reference value, wherein the greater the difference is, the smaller the value of the first baud rate B1 which is set is. Similarly, the greater the difference between the second measured temperature value T2 and the temperature reference value (the second measured temperature value T2 gets closer to the endpoint of the corresponding relationship R1), the smaller the baud rate setting value which is set is. Furthermore, the second processor 210 is configured to compare the second measured temperature value T2 with the temperature reference value; and set the second baud rate B2 according to the difference between the second measured temperature value T2 and the temperature reference value, wherein greater the difference is, the smaller the value of the second baud rate B2 which is set is.

As illustrated in FIG. 4, since the first electronic device 100 and the second electronic device 200 each include a temperature sensor, they may set the value of the baud rate of individual UART (the first UAR and the second UART) as the same value according to the measured temperature value individually and/or independently. In addition, since the first electronic device 100 and the second electronic device 200 may individually or independently set the value of the UART, the first GPIO 130 of the first electronic device 100 and the second GPIO 230 of the second electronic device 200 may not be connected; or, the electronic system 30 may even omit the first GPIO 130 and the second GPIO 230.

Figure 5:
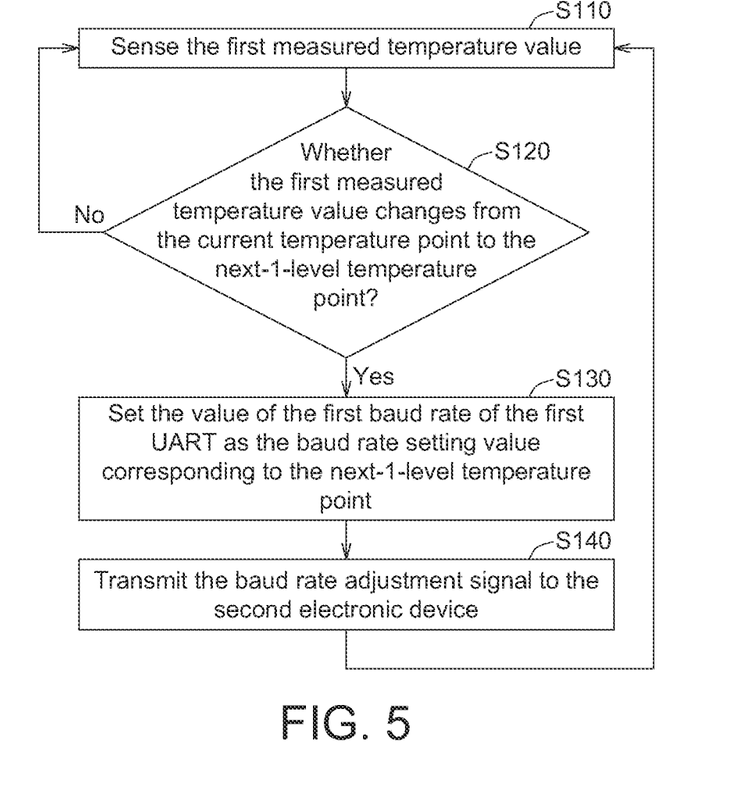
FIG. 5 illustrates a flow chart of the baud rate setting method of the electronic system in FIG. 1A.

Referring to FIG. 5, FIG. 5 illustrates a flow chart of the baud rate setting method of the electronic system 10 in FIG. 1A.

In step S110, the first temperature sensor 140 senses the first measured temperature value T1.

In step S120, the first processor 110 finds whether the first measured temperature value T1 changes from the current temperature point to the next-1-level temperature point. If yes, the process goes ahead to step S130; if not, the process returns to step S110, and the first temperature sensor 140 continues to sense the first measured temperature value T1.

In step S130, the first processor 110 sets the value of the first baud rate B1 of the first UART 120 as the baud rate setting value corresponding to the next-1-level temperature point. In an embodiment, the first processor 110 may transmit a setting command (not illustrated) to the first UART 120, and the first UART 120 may set the value of the first baud rate B1 according to the setting command.

In step S140, the first processor 110 may transmit the baud rate adjustment signal to the second electronic device 200 through the first GPIO 130.

Then, the second electronic device 200 sets the value of the second baud rate B2 of the second UART 220 as the baud rate setting value according to the baud rate adjustment signal.

Figure 6:
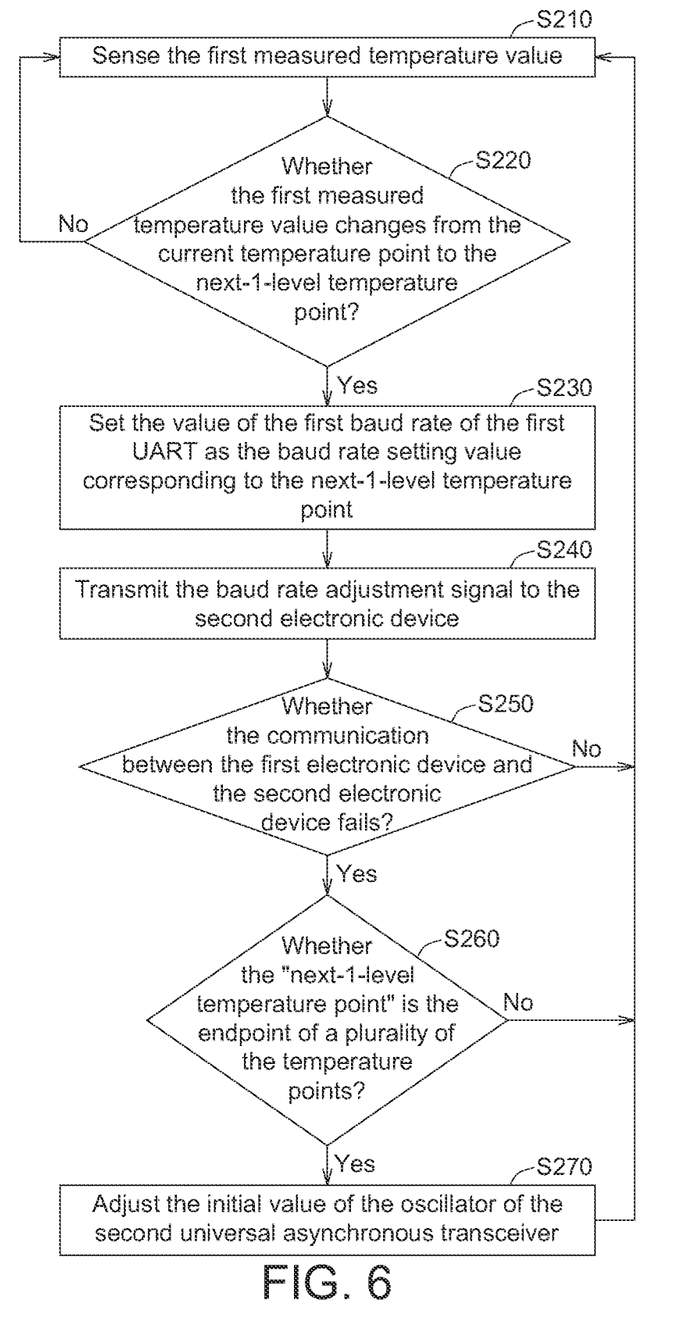
FIG. 6 illustrates a flow chart of a baud rate setting method of another embodiment of the electronic system in FIG. 1A.

Referring to FIG. 6, FIG. 6 illustrates a flow chart of a baud rate setting method of another embodiment of the electronic system 10 in FIG. 1A.

In step S210, the first temperature sensor 140 senses the first measured temperature value T1.

In step S220, the first processor 110 determines whether the first measured temperature value T1 changes from the current temperature point to the next-1-level temperature point. If yes, the process proceeds to step S230; if not, the process returns to step S210, and the first temperature sensor 140 continues to sense the first measured temperature value T1.

In step S230, the first processor 110 sets the value of the first baud rate B1 of the first UART 120 as the baud rate setting value corresponding to the next-1-level temperature point. In an embodiment, the first processor 110 may transmit the setting command (not shown) to the first UART 120, and the first UART 120 may set the value of the first baud rate B1 of the first UART according to the setting command.

In step S240, the first processor 110 may transmit the baud rate adjustment signal (S11 or S12) to the second electronic device 200 through the first GPIO 130. Then, the second electronic device 200 sets the value of the second baud rate B2 of the second UART 220 as the baud rate setting value according to the baud rate adjustment signal.

In step S250, the first processor 110 determines whether communication between the first electronic device 100 and the second electronic device 200 fails. For example, if the data transmission error rate between the first electronic device 100 and the second electronic device 200 is still higher than an allowable value, if so, it means that the communication between the first electronic device 100 and the second electronic device 200 fails, and the process proceeds to step S260; if no, the process returns to step S210, and the first temperature sensor 140 continues to sense the first measured temperature value T1.

In step S260, the first processor 110 determines that the "next-1-level temperature point" is the endpoint of a plurality of the temperature points (for example, the endpoint of the corresponding relationship R1 in FIG. 2). If so, the process proceeds to step S270; if not, the process returns to step S210, and the first temperature sensor 140 continues to sense the first measured temperature value T1.

In step S270, the first electronic device 100 transmits the oscillator adjustment signal to the second electronic device 200. The oscillator adjustment signal includes the signal the same as or similar to that of the transmitted baud rate adjustment signal (e.g., in step S240). For example, the oscillator adjustment signal and the baud rate adjustment signal may be identical. The second electronic device 200 accordingly adjusts the initial value of the oscillator 221 of the second UART 220. Then, the process proceeds to step S210, wherein the first temperature sensor 140 continues to sense the first measured temperature value T1.

In addition, the baud rate setting method of the electronic system 20 is the same as the baud rate setting method of the aforementioned FIG. 5. The difference is that, after step S140, when the second electronic device 200 receives the baud rate adjustment signal transmitted by the first electronic device 100, the second processor 210 of the electronic system 20 may transmit the acknowledgement signal ACK to the first GPIO 130 of the first electronic device 100 through the second GPIO 230.

In addition, the baud rate setting method of the first electronic device 100 of the electronic system 30 is the same as the baud rate setting method in FIG. 5, except that step S140 may be omitted, and the baud rate setting method of the second electronic device 300 of the electronic system 30 is also similar to the baud rate setting method of the first electronic device 100 in FIG. 5, except that step S140 may be omitted.

In summary, embodiments of the present disclosure provide an electronic system. The electronic system includes two electronic devices. In an embodiment, a first one of the two electronic devices may sense its first measured temperature value, set its first baud rate according to the first measured temperature value, and transmit the baud rate adjustment signal to a second one of the two electronic devices. The second one of the two electronic device set its second baud rate according to the baud rate adjustment signal. In another embodiment, a first one of the two electronic devices may sense its first measured temperature value and set its first baud rate according to the first measured temperature value, and a second one of the two electronic devices may sense its second measured temperature value and set its second baud rate according to the second measured temperature value. In other embodiments, at least one of the two electronic devices may compare its measured temperature value with the temperature reference value; and set the baud rate according to the difference between the measured temperature value and the temperature reference value, wherein the greater the difference is, the smaller the set baud rate is. As a result, the two electronic devices may transmit data at substantially the same baud rate setting, thereby reducing data transmission errors.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An electronic system, comprising:
   a first electronic device, comprising:
      a temperature sensor configured to sense a measured temperature value;
      a first Universal Asynchronous Receiver/Transmitter (UART); and
      a first processor electrically connected to the first UART and the temperature sensor, and configured to:
         set a value of a first baud rate of the first UART as a baud rate setting value according to a next-1-level temperature point based on the measured temperature value changing from a current temperature point to the next-1-level temperature point; and
         generate a baud rate adjustment signal; and
   a second electronic device, comprising:
      a second UART; and
      a second processor electrically connected to the second UART and configured to:
         set a value of a second baud rate of the second UART as the baud rate setting value according to the baud rate adjustment signal.

2. The electronic system according to claim 1, wherein the first electronic device further comprises:
   a first general-purpose input/output (GPIO) electrically connected to the first processor;
   wherein the first processor is further configured to:
      transmit the baud rate adjustment signal to the second electronic device through the first GPIO based on the measured temperature value changing from the current temperature point to the next-1-level temperature point;
   wherein the second processor is further configured to:
      set the value of the second baud rate as the baud rate setting value according to the baud rate adjustment signal.

3. The electronic system according to claim 1, wherein the current temperature point is higher than the next-1-level temperature point, the baud rate adjustment signal changes from a first level to a second level, and the second level is different from the first level.

4. The electronic system according to claim 3, wherein the second level is higher than the first level.

5. The electronic system according to claim 3, wherein the current temperature point is lower than the next-1-level temperature point, and the baud rate adjustment signal changes from the second level to the first level.

6. The electronic system according to claim 1, wherein the first processor is further configured to:
   based on the next-1-level temperature point being an endpoint of a plurality of temperature points, set the value of the first baud rate of the first UART as the baud rate setting value corresponding to the endpoint; and
   transmit an oscillator adjustment signal to the second electronic device based on communication between the first electronic device and the second electronic device failing;
   wherein the second processor is further configured to:
      adjust an initial value of an oscillator of the second UART according to the oscillator adjustment signal.

7. The electronic system according to claim 1, wherein the first processor is further configured to:
   set the value of the first baud rate as a preset value when the first electronic device is initially started; and set the value of the first baud rate as the baud rate setting value corresponding to the next-1-level temperature point based on the measured temperature value changing from the preset value to the next-1-level temperature point.

8. The electronic system according to claim 1, wherein the first processor is further configured to:
set the value of the first baud rate as a preset value when the first electronic device is initially started; and
set the value of the first baud rate as the baud rate setting value corresponding to a next-N-level temperature point based on the measured temperature value changing from the preset value to the next-N-level temperature point, wherein N is a positive integer equal to or greater than 1; and
sequentially transmit the baud rate adjustment signal for N times to the second electronic device based on the measured temperature value changing from the preset value to the next-N-level temperature point.

9. The electronic system according to claim 1, wherein the second processor is further configured to:
transmit an acknowledgement signal to the first electronic device when receiving the baud rate adjustment signal.

10. An electronic system, comprising:
a first electronic device, comprising:
a first temperature sensor configured to sense a first measured temperature value;
a first UART; and
a first processor electrically connected to the first UART and the first temperature sensor and configured to:
set a value of a first baud rate of the first UART as a baud rate setting value according to a next-1-level temperature point based on the first measured temperature value changing from a current temperature point to the next-1-level temperature point;
a second electronic device, comprising:
a second temperature sensor configured to sense a second measured temperature value;
a second UART; and
a second processor electrically connected to the second UART and the second temperature sensor and configured to:
set a value of a second baud rate of the second UART as the baud rate setting value according to the next-1-level temperature point based on the second measured temperature value changing from the current temperature point to the next-1-level temperature point.

11. An electronic device, comprising:
a temperature sensor configured to sense a measured temperature value;
a first UART; and
a first processor electrically connected to the first UART and the temperature sensor and configured to:
set a value of a first baud rate of the first UART as a baud rate setting value according to a next-1-level temperature point based on the measured temperature value changing from a current temperature point to the next-1-level temperature point; and
generate a baud rate adjustment signal;
wherein the baud rate adjustment signal is configured to allow a second processor of a second electronic device to set a value of a second baud rate of a second UART of the second electronic device as the baud rate setting value.

12. The electronic device according to claim 11, further comprising:
a first GPIO electrically connected to the first processor;
wherein the first processor is further configured to:
transmit the baud rate adjustment signal to the second electronic device through the first GPIO based on the measured temperature value changing from the current temperature point to the next-1-level temperature point;
wherein the second processor is further configured to:
set the value of the second baud rate as the baud rate setting value according to the baud rate adjustment signal.

13. The electronic device according to claim 11, wherein the current temperature point is higher than the next-1-level temperature point, the baud rate adjustment signal changes from a first level to a second level, and the second level is different from the first level.

14. The electronic device according to claim 13, wherein the second level is higher than the first level.

15. The electronic device according to claim 13, wherein the current temperature point is lower than the next-1-level temperature point, and the baud rate adjustment signal changes from the second level to the first level.

16. The electronic device according to claim 11, wherein the first processor is further configured to:
based on the next-1-level temperature point being an endpoint of a plurality of temperature points, set the value of the first baud rate of the first UART as the baud rate setting value corresponding to the endpoint; and
transmit an oscillator adjustment signal to the second electronic device based on communication between the first electronic device and the second electronic device failing;
wherein the second processor is further configured to:
adjust an initial value of an oscillator of the second UART according to the oscillator adjustment signal.

17. The electronic device according to claim 11, wherein the first processor is further configured to:
set the value of the first baud rate as a preset value when the first electronic device is initially started; and
set the value of the first baud rate as the baud rate setting value corresponding to the next-1-level temperature point based on the measured temperature value changing from the preset value to the next-1-level temperature point.

18. The electronic device according to claim 11, wherein the first processor is further configured to:
set the value of the first baud rate as a preset value when the first electronic device is initially started; and
set the value of the first baud rate as the baud rate setting value corresponding to a next-1-level temperature point based on the measured temperature value changing from the preset value to the next-N-level temperature point, wherein N is a positive integer equal to or greater than 1;
sequentially transmit the baud rate adjustment signal for N times to the second electronic device based on the measured temperature value changing from the preset value to the next-N-level temperature point.

19. An electronic device, comprising:
a temperature sensor;
a processor electrically connected to the temperature sensor and configured receive a measured temperature value from the temperature sensor; and
a UART electrically connected to the processor;
wherein the processor is further configured to:

compare the measured temperature value with a temperature reference value; and set a baud rate according to a difference between the measured temperature value and the temperature reference value;

wherein the greater the difference is, the smaller the baud rate is.

\* \* \* \* \*